United States Patent
Watanabe et al.

(10) Patent No.: US 7,599,267 B2
(45) Date of Patent: Oct. 6, 2009

(54) WRITING METHOD AND OPTICAL DISK DEVICE

(75) Inventors: Koichi Watanabe, Hachioji (JP);
Hiroyuki Minemura, Kokubunji (JP);
Mitsunori Kobayashi, Chigasaki (JP);
Kazuhiro Oda, Yokohama (JP)

(73) Assignees: Hitachi, Ltd., Tokyo (JP); Hitachi-LG Data Storage, Inc, Tokyo (JP)

( * ) Notice: Subject to any disclaimer, the term of this patent is extended or adjusted under 35 U.S.C. 154(b) by 592 days.

(21) Appl. No.: 11/503,998

(22) Filed: Aug. 15, 2006

(65) Prior Publication Data

US 2007/0280087 A1 Dec. 6, 2007

(30) Foreign Application Priority Data

May 30, 2006 (JP) ............................... 2006-150425

(51) Int. Cl.
*G11B 15/52* (2006.01)
(52) U.S. Cl. ................................. 369/47.53; 369/53.27
(58) Field of Classification Search ........................ None
See application file for complete search history.

(56) References Cited

U.S. PATENT DOCUMENTS

| 2001/0043529 A1 | 11/2001 | Minemura et al. |
| 2003/0039188 A1 | 2/2003 | Fukuchi et al. |
| 2006/0227670 A1* | 10/2006 | Terao et al. ............... 369/13.28 |

FOREIGN PATENT DOCUMENTS

| JP | 6-139574 | 5/1994 |
| JP | 2000-306241 | 11/2000 |

* cited by examiner

*Primary Examiner*—Paul Huber
(74) *Attorney, Agent, or Firm*—Antonelli, Terry, Stout & Kraus, LLP.

(57) ABSTRACT

An objective of the present invention is to enhance reliability of recorded data by preventing deterioration of OPC (Optimum Power Calibration) accuracy due to an influence of inter-layer interference in an optical disk device capable of writing in a multilayer optical disk. Aiming at the objective, a relationship between asymmetry and a signal modulation depth, which are measured by use of a standard driver is referred, and thereby an offset caused by a device, a disk, a writing state of another layer and the like is compensated. Thus, OPC is executed.

12 Claims, 15 Drawing Sheets

FIG. 8

| | Write-Once | Rewritable | RAM |
|---|---|---|---|
| Disks | CD-R<br>DVD±R<br>(BD-R) | CD-RW<br>DVD±RW<br>BD-RE<br>(BD-R) | DVD-RAM<br>MO |
| Sector Format | No | No | Yes |
| OPC Method — Modulation | ○ | ◎ | ○ |
| OPC Method — Asymmetry | ◎ | △ | ○ |
| OPC Method — Jitter | × | × | ○ |

FIG. 9

| Disk Code | Layer | Initial Write Pulse Parameters | OPC Method and Conditions | Modulation at Asymmetry=0 | Modulation at Asymmetry=0.1 |
|---|---|---|---|---|---|
| A022 | 0 | ... | ... | 0.60 | 0.65 |
| B013 | 0 | ... | ... | 0.50 | 0.55 |
|  | 1 | ... | ... | 0.53 | 0.58 |
| C0001 | 0 | ... | ... | 0.50 | 0.55 |
|  | 1 | ... | ... | 0.51 | 0.56 |
|  | 2 | ... | ... | 0.39 | 0.43 |
|  | ... | ... | ... | ... | ... |
|  | 15 | ... | ... | 0.55 | 0.59 |
|  | 2 | ... | ... | 0.40 | 0.43 |
|  | ... | ... | ... | ... | ... |
|  | 15 | ... | ... | 0.50 | 0.59 |
| ... | ... | ... | ... | ... | ... |

WRITING METHOD AND OPTICAL DISK DEVICE

CLAIM OF PRIORITY

The present invention application claims priority from Japanese application JP 2006-150425 filed on May 30, 2006, the content of which is hereby incorporated by reference into this application.

BACKGROUND OF THE INVENTION

1. Field of the Invention

The present invention relates to an optical disk writing method and a device for writing information by forming written marks having physical properties different from those of the other portions on a recording medium.

2. Description of the Related Art

As writable type optical disks, many kinds of disks such as a CD-R/RW, a DVD-RAM, a DVD±R/RW and a Blu-ray Disc (BD) have been commercialized and widely used. As one of major technologies of increasing a capacity of an optical disk in the future, there is a multilayer technology of forming a plurality of recording layers. As examples of the multilayer technology, DVD±R and BD-RE dual-layer disks have been already commercialized. In a writing type optical disk device, a write power of each medium is calibrated depending on variable factors, such as a temperature, a wavelength of a light source and variations in manufacturing of a medium, by use of a method called Optimum Power Calibration (OPC), in order to constantly write user data with a proper write power.

As to a multilayer disk, in order to prevent occurrence of an error in determination of the write power due to return light from layers other than a layer in which the OPC is executed (hereinafter the return light is called inter-layer interference), devices are generally adopted for currently manufactured dual-layer disks. For example, OPC execution regions of respective layers are laid out not to overlap with each other in the thickness direction. As the OPC method, the following methods are known.

(1) OPC Method Mainly for Write-Once Disk

As an example of an OPC method using asymmetry, Japanese Patent Application Laid-Open Official Gazette No. Hei 6 (1994)-139574 discloses an OPC technology using a method of equalizing asymmetry of a repetitive signal of a shortest mark and a space and asymmetry of a repetitive signal of a longest mark and a space.

(2) OPC Method Mainly for Rewritable Disk

As an example of an OPC method using signal modulation depth (or reflectance), Japanese Patent Application Laid-Open Official Gazette No. 2000-306241 discloses an OPC technology using a method of finding a write power by multiplying a power, which maximizes a change in the reflectance relative to a change in the write power, by a coefficient. Moreover, Japanese Patent Application Laid-Open Official Gazette No. 2003-067925 discloses an OPC technology using a method of determining a write power by use of a slope itself of a change in a modulation depth relative to the write power or a slope of a change in a γ value. Here, the γ value is a value standardized by use of a rate of the change in the modulation depth and a rate of a change in the write power, and is an indicator robust to a set offset of the write power. As the same kind of indicator, there is a so-called κ value. By use of the κ value, a threshold power of writing can be accurately obtained. Since the so-called γ value and κ value are widely known among optical disk engineers and are beyond the scope of the present invention, detailed description thereof will not be given here.

(3) OPC Method Mainly for Sector Format Disk

Japanese Patent Application Laid-Open Official Gazette No. Hei 10 (1998)-320777 discloses an OPC technology using a method for determining a write power based on an amount equivalent to jitter which is measured by measuring a phase difference between a PLL clock and a data edge.

SUMMARY OF THE INVENTION

As described above, the conventional OPC methods include methods using the signal modulation depth, the asymmetry and the jitter, respectively. Moreover, in a dual-layer optical disk, the OPC execution region of one layer is generally laid out so as not to overlap with the OPC execution region of the other layer in the thickness direction, for the purpose of reducing influences of inter-layer interference relative to recorded/unrecorded states of the other layer, and the like. When, in an optical disk having three layers or more, the OPC execution regions of respective layers are laid out so as not to overlap with each other in the thickness direction as in the conventional case, the OPC regions in a disk having 16 recording layers have to be either reduced in size to 1/16 of that of a single layer disk or enlarged by reducing a user data region. Neither of the situations described above is suitable in consideration of reliability and users' benefit. Thus, some kind of new technology has been required.

FIG. 1 is a view showing an example of a result obtained by simulating, by means of a linear diffraction calculation, a light intensity distribution on a photodetector when a BD dual-layer disk is read. As shown in FIG. 1, light reflected off a layer (here, a first layer) which reads data forms an image on a center part of the photodetector. At the same time, light reflected off a layer (here, a second layer) which does not read data forms an image widely on a face where the photodetector is placed due to the influence of defocusing and spherical aberration. The inter-layer interference described in the present invention indicates an influence of the latter as well as optical interference between the former and the latter. In simple terms, inter-layer interference light is added to signal light from the layer reading the data, and thereby generating an offset in a readout signal.

The simulation result described above is a result obtained in an ideal case where there is neither aberration nor displacement of an attachment position of the photodetector. The inter-layer interference light is widely distributed. Thus, the degree of the inter-layer interference varies depending on various factors such as a displacement of a photodetector position, a displacement of a detector lens attached position, a displacement of an interval between the layers of the disk, and the like. Therefore, when the degree of the inter-layer interference varies due to a factor such as a variation in manufacturing of the disk or a head, a write power figured out by use of the OPC methods deviates from a proper value. In the case of the dual-layer disk, the degree of the inter-layer interference on one layer is about 15% at a maximum in comparison with an unrecorded level. This figure, 15% on one layer, is a sum of a component of about 10% due to variations in manufacturing of the head and the medium and a component of about 5% due to a difference between recorded and unrecorded states of the other layer. In a disk having three layers or more, an inter-layer interference amount is expected to be further increased.

FIG. 2 is a schematic diagram showing a difference between influences emerging in a readout signal of a disk depending on a degree of inter-layer interference. Even if the same data block of the same disk is read, the degree of the inter-layer interference varies depending on an individual difference among optical heads. Thus, a magnitude of an offset Δ emerging in the readout signal varies.

FIG. 3 is a schematic diagram showing a difference between influences emerging in a readout signal of a disk depending on whether data is recorded or unrecorded in a layer other than a target layer. In the case where the target layer is the innermost layer when viewed from the optical head, if reflectance and transmittance are changed as a result of writing the data in the other layer, a degree of inter-layer interference is changed. Thus, a magnitude of an offset Δ emerging in the readout signal varies.

FIG. 4 is a diagram showing a relationship between the amount of an offset caused by inter-layer interference and a signal modulation depth. As shown in FIG. 4, when an offset is caused in a readout signal by the inter-layer interference, a write power to be obtained is shifted from a proper value in a case of an OPC method for a rewritable optical disk, by which the write power is determined according to the signal modulation depth.

An object of the present invention is to provide an OPC method capable of constantly determining a proper write power by calibrating inter-layer interference for a multilayer optical disk, and to provide an optical disk device using the OPC method.

The present invention aims at enabling highly reliable writing of user data to be executed by performing a high-precision OPC operation also in a multilayer optical disk having three layers or more. First, a conventional OPC method will be briefly described Thereafter, a description will be given of a method of realizing a multilayer structure having three layers or more.

Writing optical disks are classified broadly into: a write-once optical disk using an organic pigment material or the like as a recording layer; and a rewritable optical disk using a phase change recording material or the like as a recording layer. Moreover, as the rewritable optical disk, there are one in which emphasis is on compatibility with a ROM disk and one, having a sector structure, in which emphasis is on random access capability. Here, referring to commercial DVD-R and DVD-RW disks, differences in OPC methods due to recording materials will be described.

FIGS. 5A to 5C are graphs each showing a result of an experiment concerning a relationship between a write power of a commercial DVD-RW disk and each of evaluation indicators. FIG. 5A shows a relationship between the write power and jitter. FIG. 5B shows a relationship between the write power and a signal modulation depth. FIG. 5C shows a relationship between the write power and asymmetry. As to the write power, a proper write power is normalized as 100% in FIGS. 5A to 5C. FIGS. 6A to 6C are graphs each showing a result of a similar experiment concerning a relationship between a write power of a commercial DVD-R disk and each of evaluation indicators.

When a rate of change in the asymmetry relative to a change in the write power shown in FIG. 5C is compared with that shown in FIG. 6C, it is found out that the rate of change is relatively small in the DVD-RW which is a rewritable type and the rate of change is relatively large in the DVD-R which is a write-once type. This results from a difference in characteristics of recording materials. In the DVD-RW which is the rewritable type, both writing and erasing of data are performed at the same time. Accordingly, when it is tried to form a large mark by increasing the write power, an effect that an excess write power (or erasing power) reduces (erases) the mark also occurs at the same time. As a result, a change in the size of the written mark relative to the change in the write power is reduced. This is the reason why the rate of change in the asymmetry relative to the write power is relatively small. Meanwhile, in the DVD-R which is the write-once type, a written mark cannot be erased. Thus, when the write power is increased, the written mark to be formed is also increased according to an increase in a thermal energy. This is the reason why the rate of change in the asymmetry relative to the write power is relatively large.

As described above, the difference in the rate of change in the asymmetry, that is, the size of the written mark to be formed, relative to the write power also appears in behavior of the jitters. As is clear from comparison of FIGS. 5A and 6A, the DVD-RW having a smaller rate of change in the size of the written mark relative to the write power has a power margin larger than that of the DVD-R.

Therefore, an suitable OPC method for the DVD-RW having the smaller rate of change in the asymmetry relative to the write power is a method where a threshold power (Pth shown in FIG. 5B) for writing is figured out from the signal modulation depth without using the asymmetry, and then a proper write power is figured out by multiplying the threshold power by a predetermined coefficient. Moreover, as an OPC method for the DVD-R having a larger rate of change in the asymmetry relative to the write power, a method is generally used in which a write power is directly figured out so as to make the asymmetry equal to a predetermined value. It is also possible, however, to figure out the write power based on the modulation depth as in the case of the DVD-RW.

FIGS. 7A to 7C are graphs each showing a result of an experiment of measuring a relationship between a write power of a commercial rewritable BD-RE dual-layer disk and each of the evaluation indicators. FIG. 7A shows a relationship between the write power and the-jitter. FIG. 7B shows a relationship between the write power and the signal modulation depth. FIG. 7C shows a relationship between the write power and the asymmetry. Currently, a write-once BD disk is not commercially available, but the above-described difference in characteristics due to recording materials is a universal characteristic and independent on a format of an optical disk. Thus, for the BD disk, similarly, a proper OPC method differs between the rewritable type and the write-once type.

Next, a difference in formats of optical disks will be described. As a recording optical disk, there are: one having a sector structure, in which emphasis is on random access capability (a DVD-RAM, a 3.5" magneto-optical disk and the like); and one having no sector structure, in which emphasis is on compatibility with a ROM disk (a CD-R/RW, a DVD±R/RW, a BD-RE/R and the like). The former has a header part in which address information is written at pre-pits and the like for each sector, and a data part capable of writing. The data part in one sector is not physically continuous with the data parts in the adjacent sectors. Thus, for example, in order to execute high-speed pull-in processing of a clock from a phase locked loop (PLL) circuit generating the clock for reading data, a pull-in pattern (a VFO pattern) is added to a top of the data part. Therefore, even if a data pattern is recorded while a write power is being changed for each sector at the time of OPC, the clock can be pulled in from the PLL circuit at the top of each sector upon readout. For example, it is easy to execute the OPC using, as an evaluation indicator, jitter which is a phase difference between the data and the clock, or the like.

Meanwhile, in the case of the format having no sector structure, such as the latter, even if a data pattern is written while a write power is being changed for each sector, pull-in of a clock is slow since a PLL circuit is continuously operated at the time of readout. Moreover, when the PLL circuit becomes unstable due to an influence of a defect and the like in the previous sector, a subsequent sector is also affected. Thus, it is very difficult to execute the OPC by use of evaluation indicators while setting a PLL clock such as jitter to be a reference. Thus, for the latter, the following OPC method is generally used without using the PLL circuit. Specifically, a signal modulation depth and asymmetry are measured by use of outputs respectively of top and bottom envelope detectors and a low-path filter of a recorded signal. Thereafter, a write power is determined based on the measured values.

FIG. 8 is a table collectively showing suitable OPC methods according to differences in a recording material and a disk format.

As described above, in the rewritable optical disk, the rate of change in the asymmetry relative to the change in the write power is small. Thus, the write power is determined by performing the OPC based on the signal modulation depth. However, the signal modulation depth varies due to an offset amount caused by inter-layer interference. Thus, there is a problem that the write power deviates from a proper value by using this method, as it is. In addition, there is another problem that, as the number of layers is increased, it becomes difficult to secure proper OPC regions.

Therefore, the present invention focuses attention on the fact that a change in the asymmetry relative to the write power is small in the rewritable optical disk. As described above, the influence of the inter-layer interference appears as an offset amount on a readout signal. Meanwhile, by definition, the asymmetry is not influenced by the offset. Therefore, a proper write power can be determined, by use of a standard driver in which a write power and pulse conditions are set, in the following manner. Specifically, relationships between a signal modulation depth and asymmetry relative to the write power are held as a database. In a mass-produced driver, by referring to the database at the time of OPC, the offset amount caused by the inter-layer interference is compensated, and the modulation depth is recalculated. Thereafter, by determining a write power based on the compensated modulation depth, a difference from an optical head mounted on the standard driver is compensated, whereby the proper write power can be determined.

To be more specific, as shown in FIG. 9, together with information on initial values of write pulse and power according to the type of the optical disk and the number of layers, values of the modulation depth when the asymmetry measured by the standard driver is 0 and, for example, when the asymmetry is 0.1, are collected as a standard database in a table. The table is stored in a memory region of control software. In the mass produced driver, by referring to the standard database, the offset amount caused by the inter-layer interference is compensated based on the relationship shown in FIG. 4 so as to make, for example, the modulation depth when the asymmetry is 0, equal to that of the standard driver. Thus, the OPC of the same standard as that of the standard driver can be realized also in the mass produced driver. Consequently, the influence of the inter-layer interference can be compensated.

Moreover, even if data is recorded in the layer other than the target layer of a disk to be written in the mass production driver, an offset caused by the recorded data can be compensated, by storing data in the database shown in FIG. 9 as observed values in a state where a layer other than a target layer is unrecorded. Thus, OPC execution regions of the respective layers can be laid out so as to overlap in the thickness direction. Consequently, it is possible to secure a required OPC region without reducing a user region.

Here, the description has been given of the method of storing the values of the modulation depth when the asymmetry is 0 and 0.1. However, for this purpose, it is only necessary to meet a condition that rates of change in the asymmetry and the signal modulation depth relative to the write power are small, in other words, a condition that the write power is large. Here, the reason why the values for the two asymmetry values are held is to make it possible to determine an offset amount due to inter-layer interference in each region of a disk based on a predetermined asymmetry amount, when data is written with a constant write power figured out from the rates of change in the asymmetry and the signal modulation depth, as described later.

Accordingly, also for a multilayer optical disk having three layers or more, it is possible to provide an OPC method of determining a proper write power by compensating the influence of inter-layer interference. Thus, the highly reliable writing method and optical disk device can be provided. Note that the present invention is effective not only for a rewritable optical disk but also for a write-once optical disk.

By use of a writing method and an optical disk device according to the present invention, it is possible to compensate an influence of an offset caused by inter-layer interference in a multilayer disk, and to realize OPC for determining a proper write power. Thus, high reliability can be secured even for the multilayer disk.

BRIEF DESCRIPTION OF THE DRAWINGS

FIG. 8 is a table collectively showing suitable OPC methods according to differences in a recording material and a disk format.

FIG. 9 is a table showing an example of a standard database of OPC data according to the present invention.

DETAILED DESCRIPTION OF THE PREFERRED EMBODIMENT

The present invention will be described in detail below by use of examples.

Figure 10:
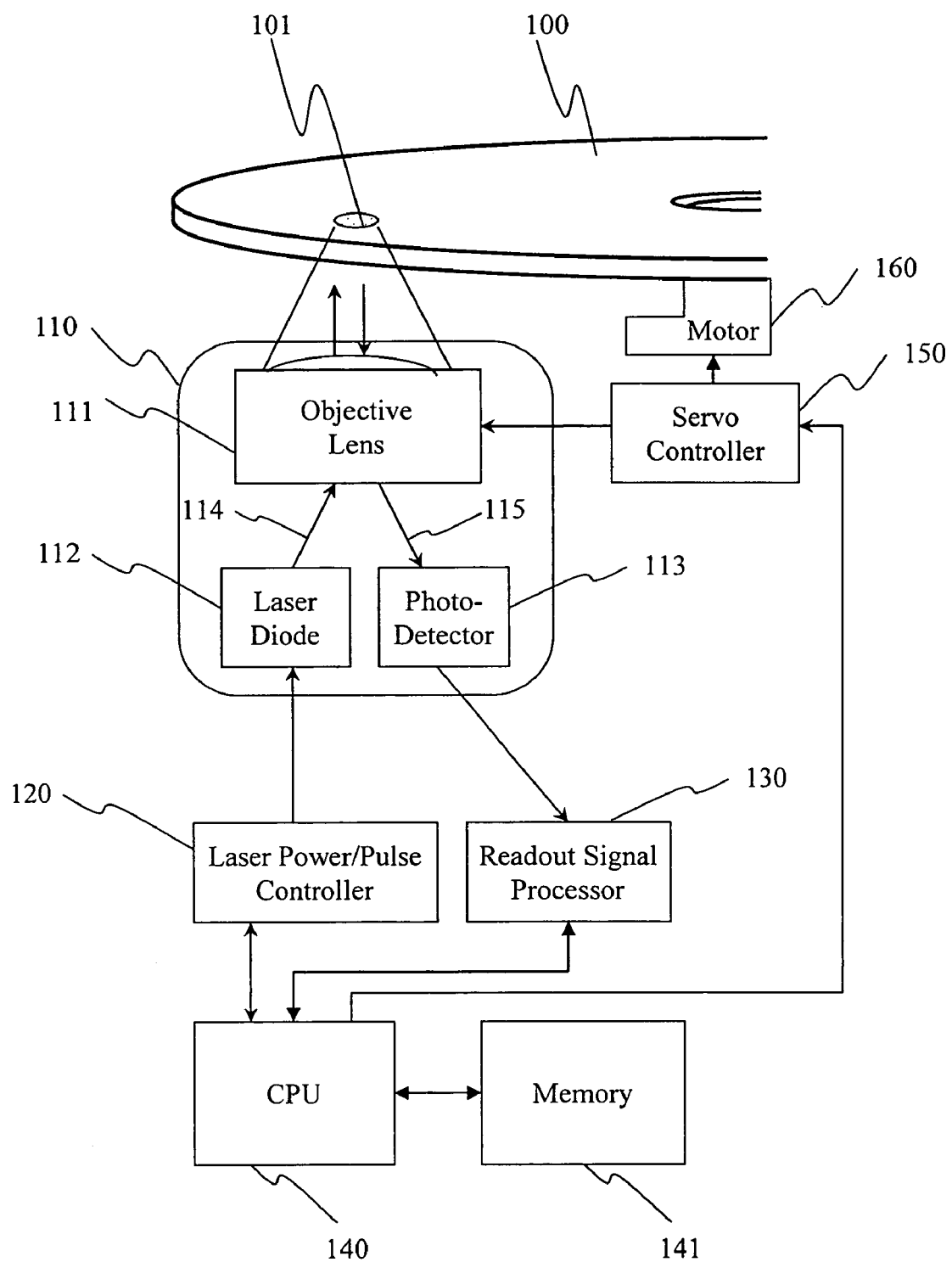
FIG. 10 is a schematic diagram showing a configuration example of an optical disk device of the present invention.

FIG. 10 is a schematic diagram showing a configuration example of an optical disk device of the present invention. An optical disk medium 100 is rotated by a motor 160. At the time of reading, a laser power/pulse controller 120 makes a control to cause a current to flow into a laser diode 112 in an optical head 110 in order to generate a laser beam 114 having a light intensity instructed by a CPU 140. The laser beam 114 is collected by an objective lens 111 to form a light spot 101 on the optical disk medium 100. Reflected light 115 off the light spot 101 is detected by a photodetector 113 through the objective lens 111. The photodetector is formed of a light-detecting element divided into a plurality of pieces. By use of a signal detected by the optical head 110, a readout signal processor 130 reads information recorded on the optical disk medium 100. At the time of writing, the laser power/pulse controller 120 makes a control to cause pulse light to be emitted from the semiconductor laser diode 112 by converting predetermined writing data into a predetermined write pulse current. The readout signal processor 130 includes circuits required for a writing method of the present invention. Moreover, the standard database shown in FIG. 9 is held in a memory 141, and a sequence to be described later is executed as a program inside the CPU 140. With this configuration, the optical disk device of the present invention can be provided.

Figure 11:
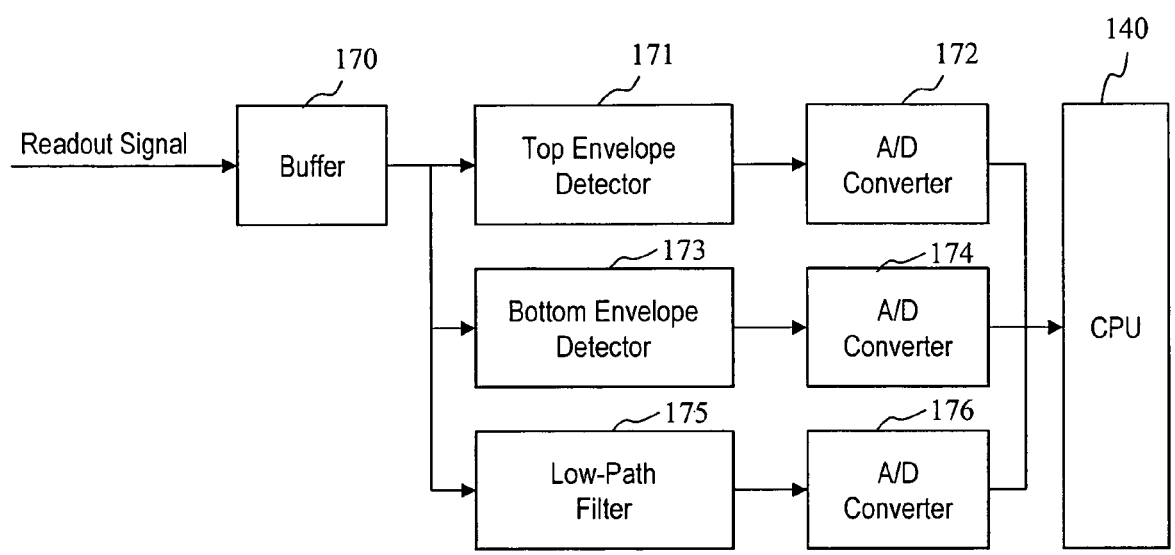
FIG. 11 is a block diagram showing a configuration example of a signal processor.

FIG. 11 is a block diagram showing a configuration example of a signal processor suitable to be mounted in the optical disk device of the present invention. Once a readout signal enters a buffer 170, the readout signal is processed by a top envelope detector 171, a bottom envelope detector 173 and a low-path filter 175. The processed data are digitized by A/D converters 172, 174 and 176, respectively, and handed over to the CPU 140.

Figure 12:
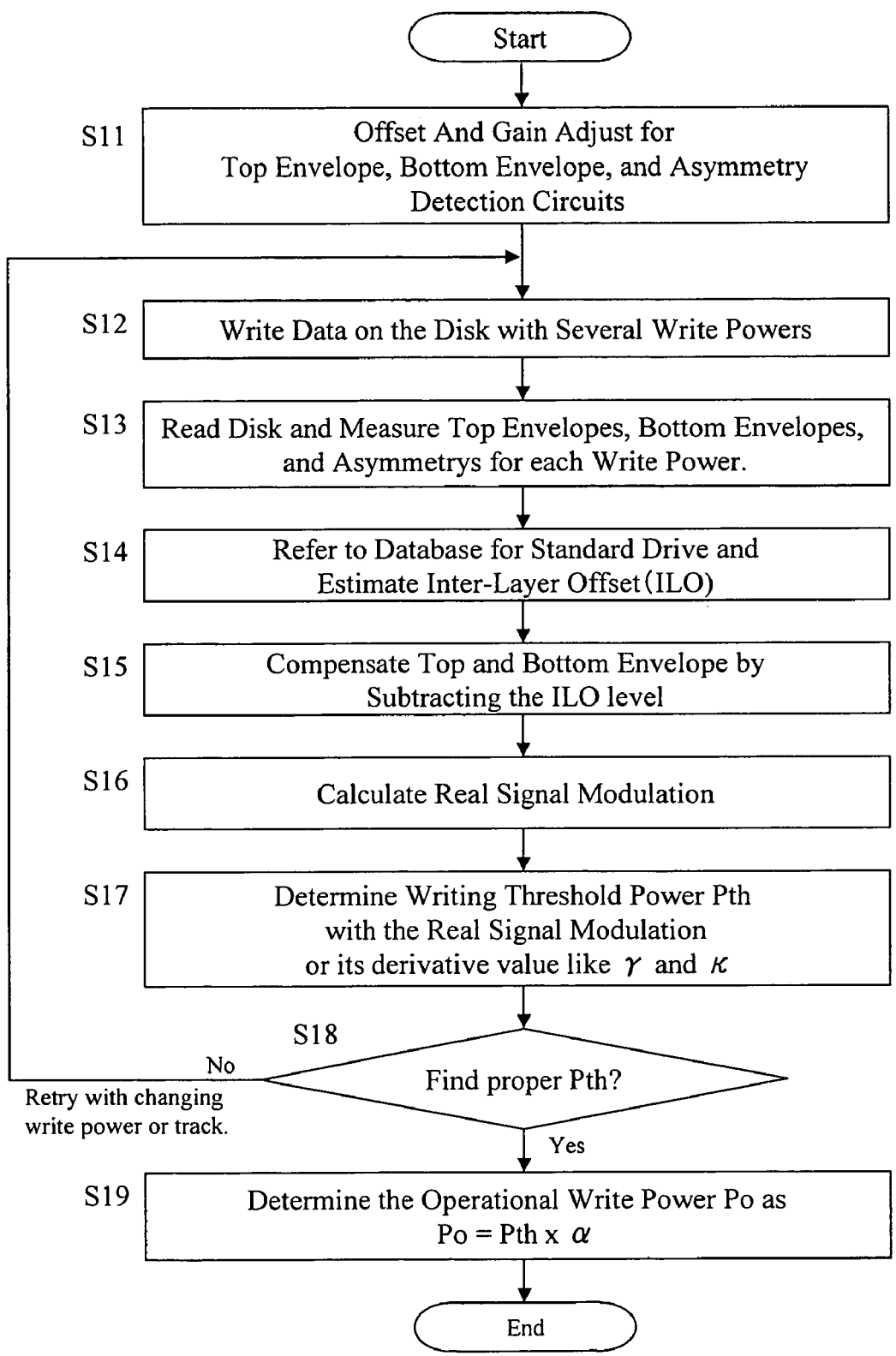
FIG. 12 is a flowchart showing a flow of processing according to an example of the present invention.

FIG. 12 is a flowchart showing a flow of processing in the example of the present invention. In FIG. 12, a first stage is an offset calibration stage for circuits. At this stage, an offset amount is determined so as to equalize outputs of the top envelope detector 171, the bottom envelope detector 173 and the low-path filter 175 in a state where a light source 112 emits no light, in a state where an unrecorded track is read or in both of the states (S11).

A second stage is a data writing stage. At this stage, a specific data pattern is recorded on the disk, while, for example, a write power is being changed by the sector (S12). The sector described here may be, for example, a logical sector (2 KB-long) of a CD or a DVD, or a sector of a region length specifically determined by a driver.

A third stage is a data readout stage. The recorded data pattern is read to obtain a top envelope value, a bottom envelope value and a low-path filter value for each write power. The above values can be easily obtained in the following manner. First, the output from the top envelope detector 171, the bottom envelope detector 173 and the low-path filter 175 are digitized respectively with the AD converters 172, 174 and 176, and are inputted to the CPU 140. Then, averaging processing and the like are performed on the data within regions each corresponding to each write power. Assuming that the top envelope value is a, the bottom envelope value is b and the low-path filter value is c, a modulation depth m and asymmetry β are figured out by the following equations, based on these observed values (S13):

$$m = (a-b)/a \qquad (1)$$

$$\beta = \{(a+b)/2 - c\}/(a-b) \qquad (2).$$

Assuming that top and bottom envelope values measured by a standard driver are $a_0$ and $b_0$, the following equations (3) to (5) are established:

$$a = g(a_0 + \Delta) \qquad (3)$$

$$b = g(b_0 + \Delta) \qquad (4)$$

$$m_0 = (a_0 - b_0)/a_0 \qquad (5),$$

where, g denotes a coefficient indicating a difference in gains between the driver and the standard driver; Δ denotes an inter-layer interference amount observed in the driver; and $m_0$ denotes a modulation depth observed in the standard driver.

As described above, since the asymmetry amount is not dependent on the inter-layer interference, the inter-layer interference amount Δ when the asymmetry is a predetermined value can be obtained (S14).

$$\Delta = a(m_0 - m)/m \qquad (6)$$

Assuming that the top and bottom envelope values in which the inter-layer interference is compensated are newly set to a' and b', respectively, a' and b' can be figured out by the following equations (S15).

$$a' = a - \Delta \qquad (7)$$

$$b' = b - \Delta \qquad (8)$$

Next, a modulation depth m' in which the inter-layer interference is compensated is figured out by the following equation (S16).

$$m' = (a' - b')/a \qquad (9)$$

Figure 13:
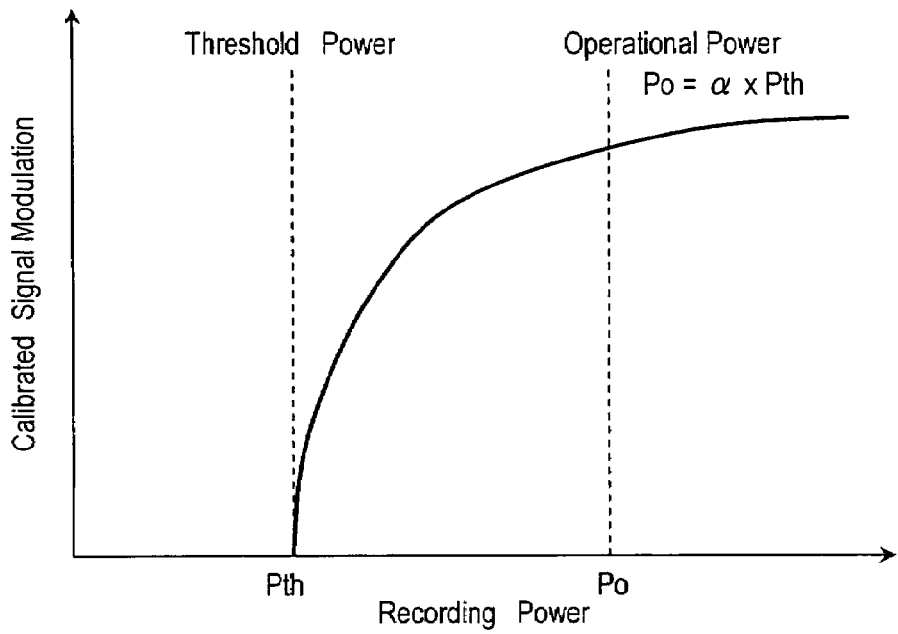
FIG. 13 is a schematic diagram showing how to figure out a write power.

By use of the compensated modulation depth m' thus figured-out, a threshold power Pth is figured out by the method described in Japanese Patent Application Laid-Open Official Gazette No. 2000-306241, for example (S17). When the threshold power Pth is found, a write power Po is finally determined based on the following equation using a constant α (S19). FIG. 13 schematically shows how to figure out the write power.

$$Po = Pth \times \alpha \qquad (10)$$

When the write power is properly determined, the processing is finished. On the other hand, when some kind of error occurs, the processing returns to Step 12 to perform a proper retry, such as changing the write power. Thus, the OPC in which the inter-layer interference is compensated can be realized.

As a writing pattern of the present invention, a random pattern according to a general encoding rule can be used. However, in this case, dispersion of measured data is increased according to frequency characteristics (droop characteristics) of the envelope detectors. The variation is increased because of the following reason. Specifically, in the random pattern, all frequency components within a band are distributed. However, the envelope detectors are structurally required to properly select a charge time constant and a discharge time constant. Thus, a difference in envelope detection values to be outputted occurs depending on frequency components of a readout signal.

Figure 14:
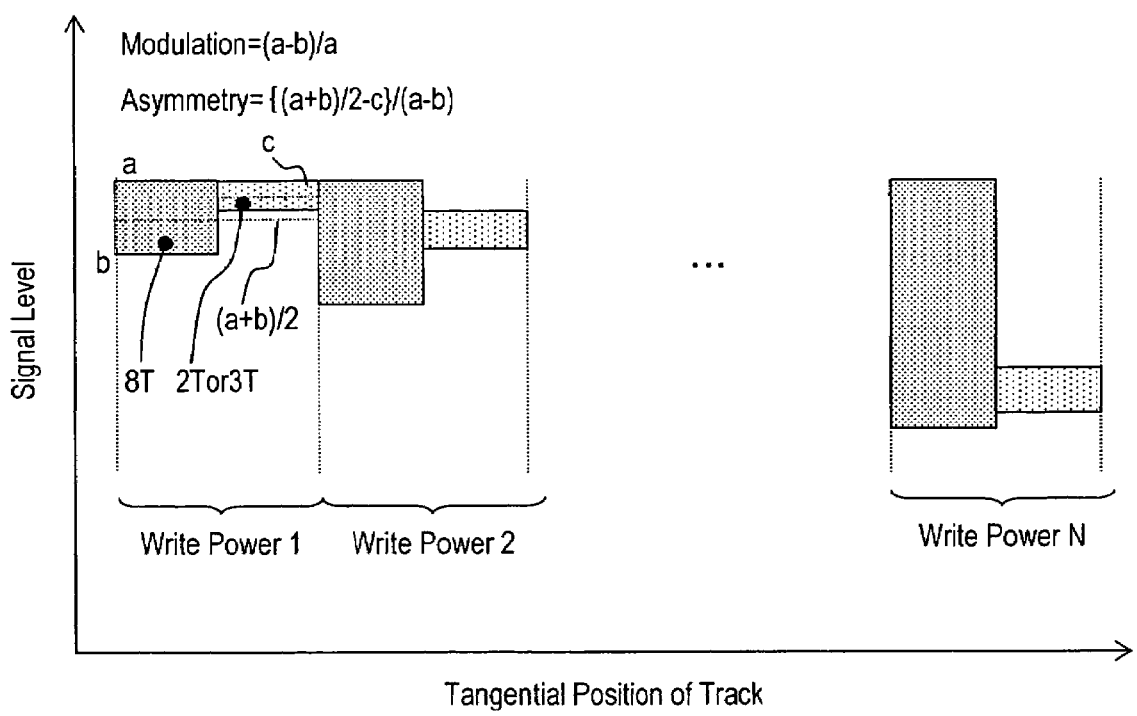
FIG. 14 is a schematic diagram showing a data pattern for OPC suitable for a writing method of the present invention.

FIG. 14 is a schematic diagram showing a data pattern for the OPC suitable for a writing method of the present invention. In the present invention, since the signal modulation depth and the asymmetry are measured at the same time, it is impossible to write a repetitive pattern of only long marks. In the example shown in FIG. 14, assuming BD, a repetitive pattern consisting of an 8T mark that is the longest run length and a space, and a repetitive pattern consisting of a 2T mark that is the shortest run length and a space are used as a pair so as to write or read for each write power. In the readout signal, as shown in FIG. 14, the signal modulation depth and the asymmetry vary with an increase in the write power. By use of the writing pattern shown in FIG. 14, writing a single cycle of the pattern makes it possible to reduce an influence of a difference in the droop characteristics depending on the frequencies of the envelope detector, thereby enhancing accuracy of determining the write power.

Figure 1:
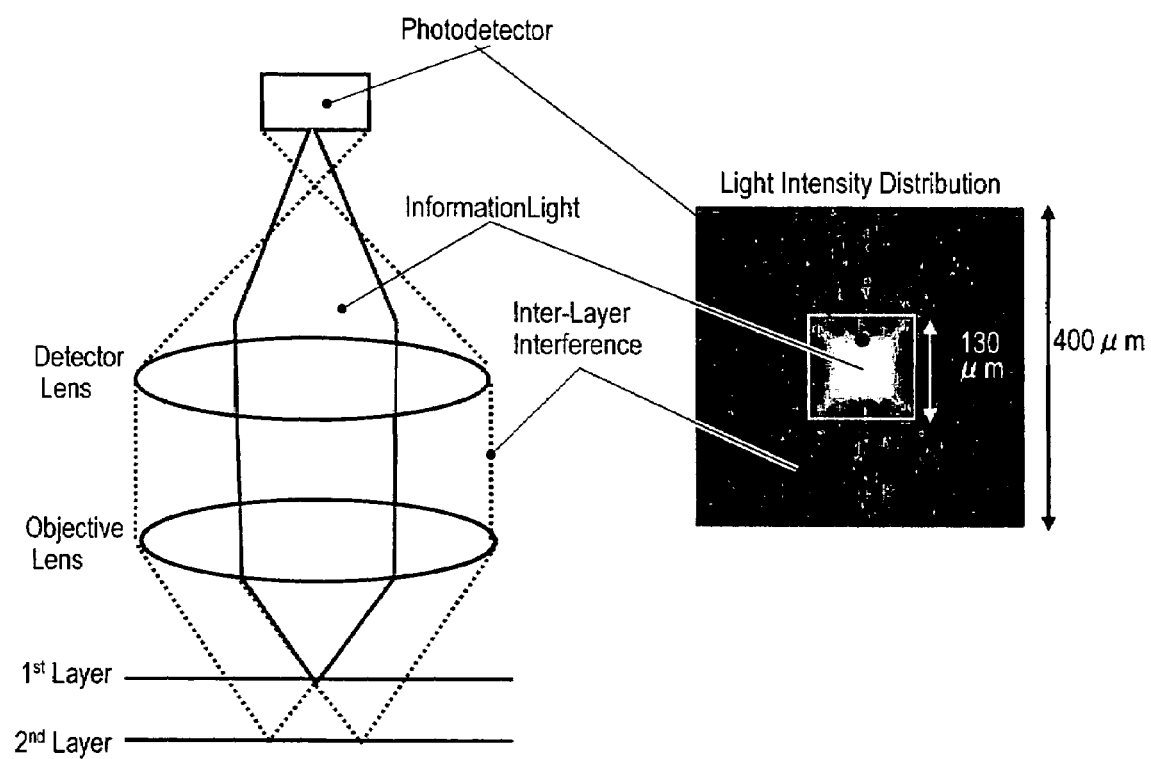
FIG. 1 is a view showing a result obtained by simulating, by use of a linear diffraction calculation, a light intensity distribution on a photodetector when a BD dual-layer disk is read.
Figure 2:
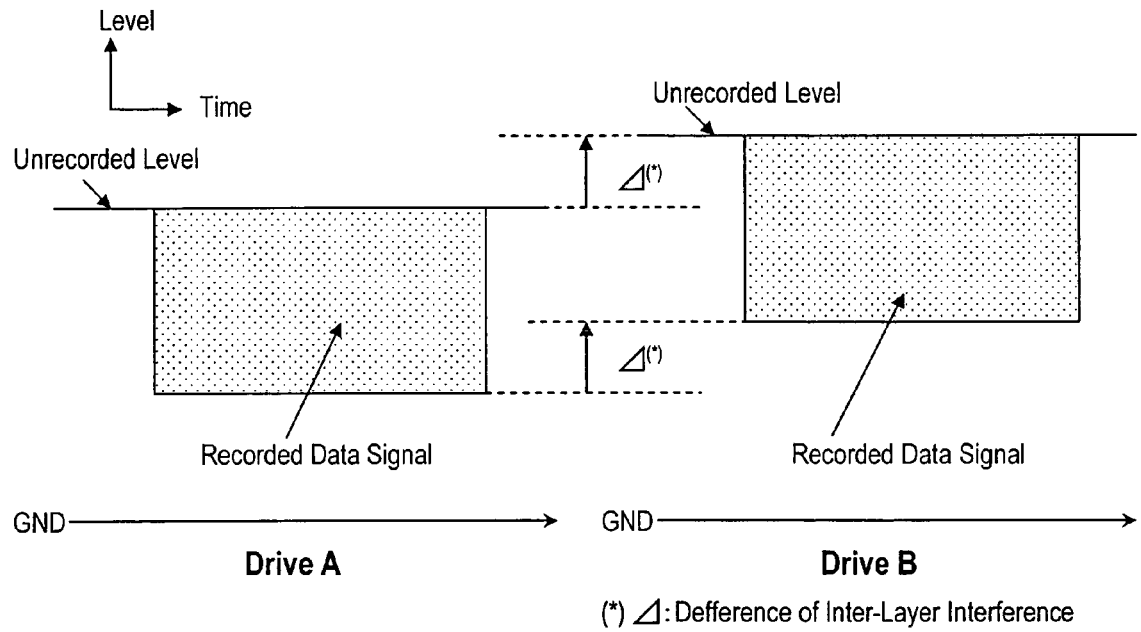
FIG. 2 is a schematic diagram showing a difference in an influence emerging in a readout signal of a disk depending on a degree of inter-layer interference.
Figure 3:
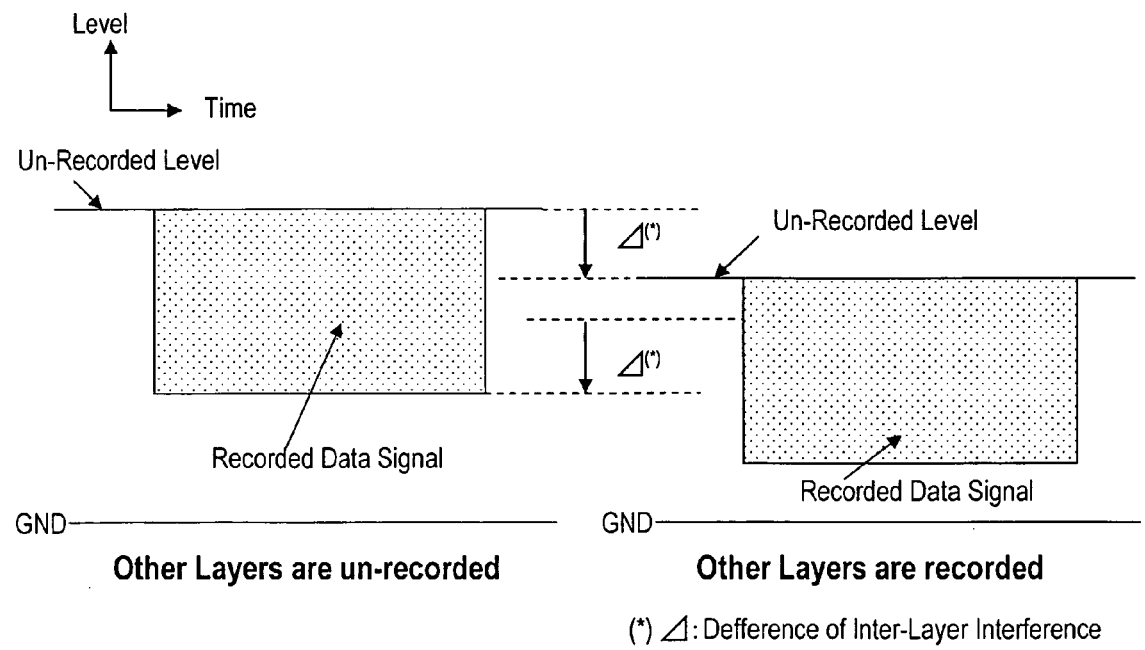
FIG. 3 is a schematic diagram showing a difference in an influence emerging in a readout signal of a disk between in the case where data is recorded in a layer other than a target layer and in the case where the data is unrecorded.
Figure 4:
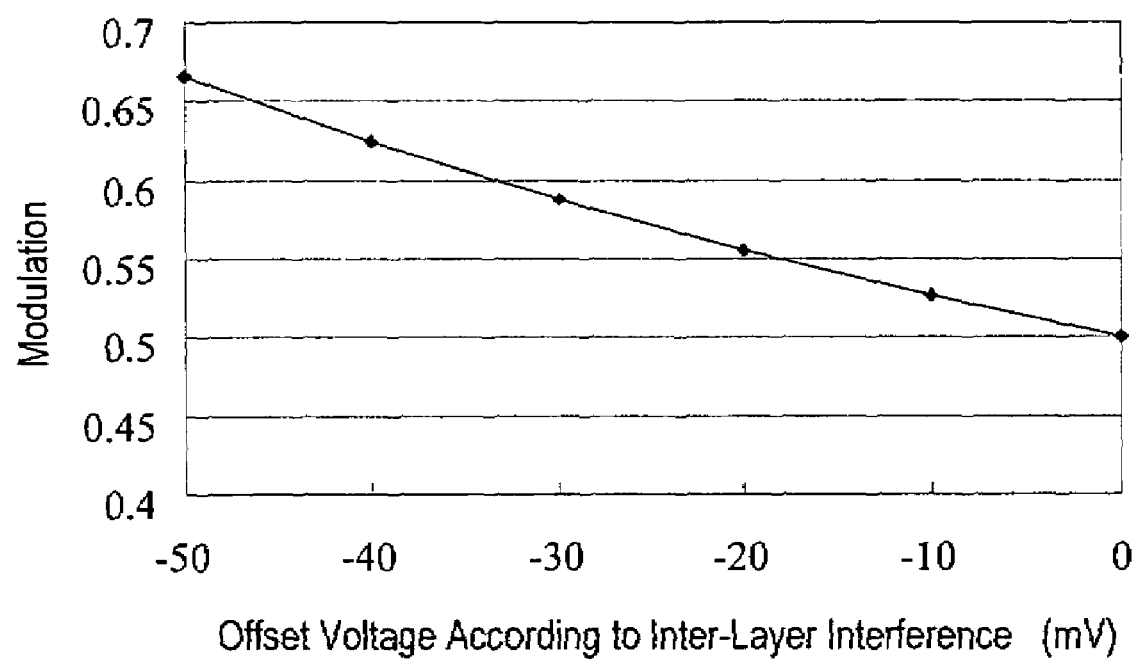
FIG. 4 is a graph showing a relationship between the amount of an offset caused by inter-layer interference and a signal modulation depth.
Figure 5:
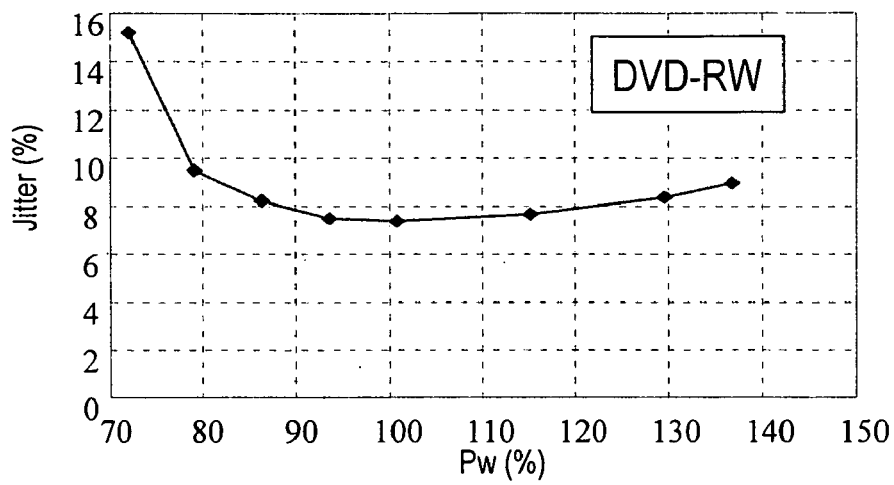
FIGS. 5A to 5C are graphs, each showing a result of an experiment concerning a relationship between a write power of a commercial DVD-RW disk and each evaluation indicator.
Figure 5:
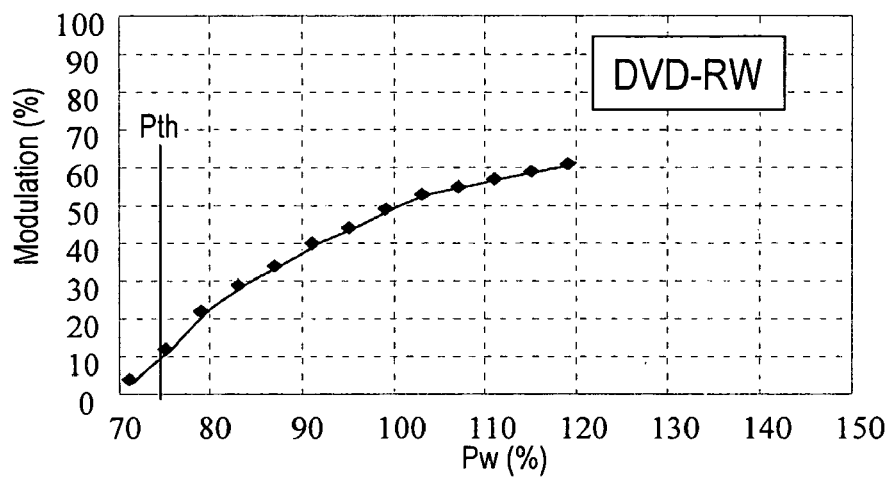
Figure 5:
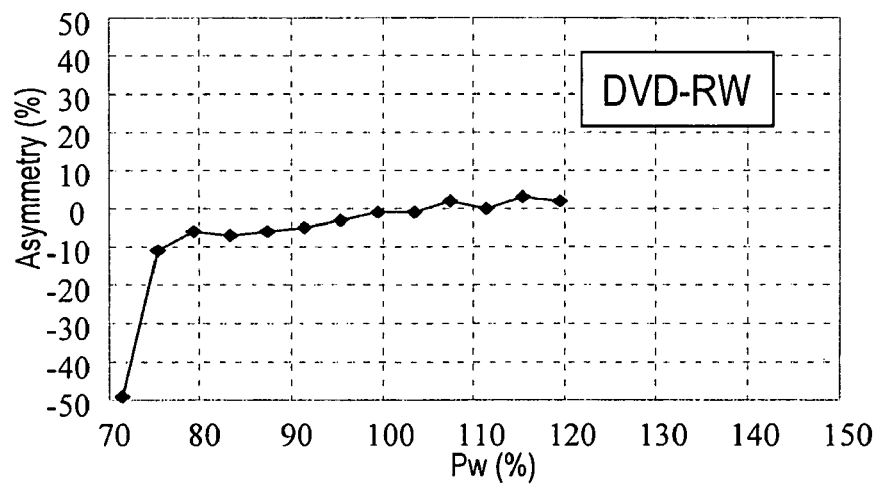
Figure 6:
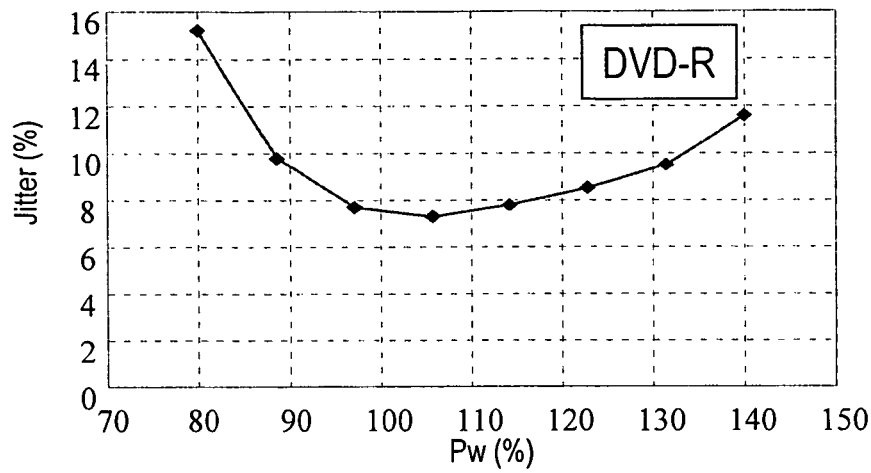
FIGS. 6A to 6C are graphs each showing a result of an experiment concerning a relationship between a write power of a commercial DVD-R disk and each of evaluation indicators.
Figure 6:
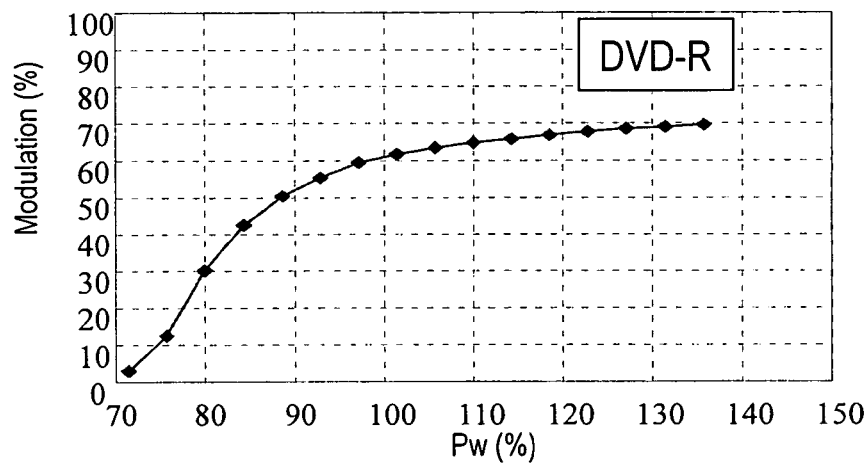
Figure 6:
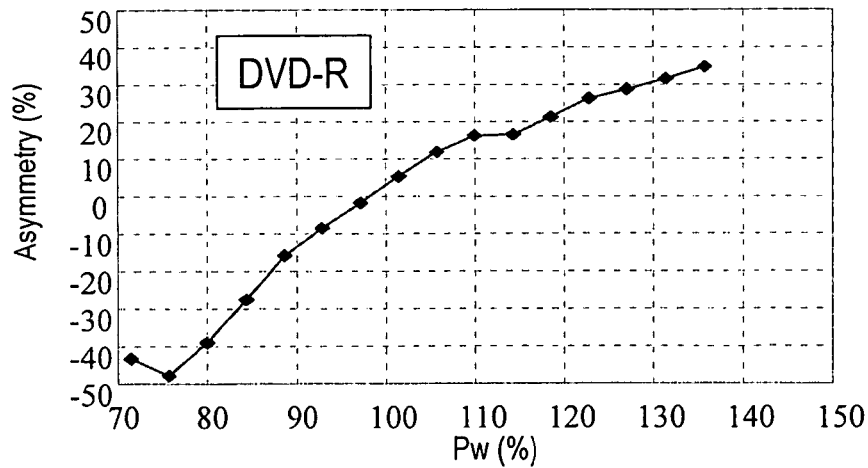
Figure 7:
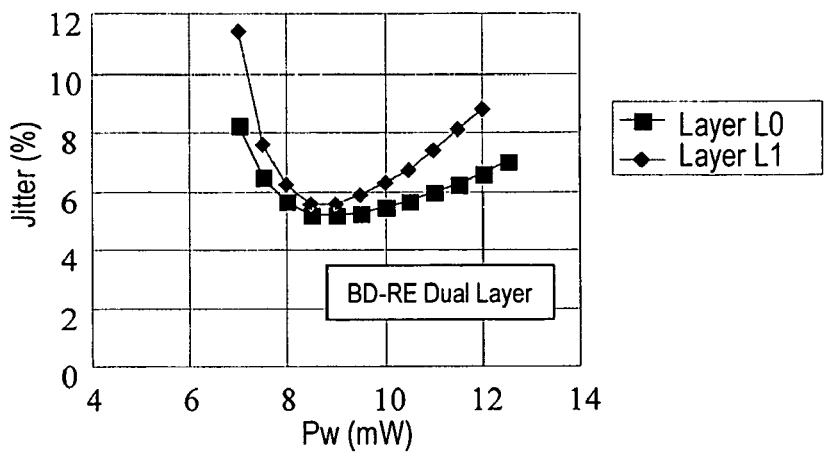
FIGS. 7A to 7C are graphs each showing a result of an experiment of measuring a relationship between a write power of a commercial rewritable BD-RE dual-layer disk and each of the evaluation indicators.
Figure 7:
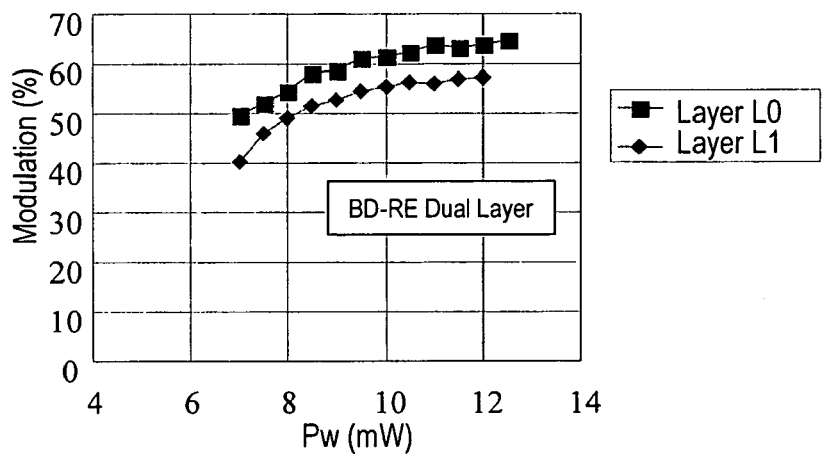
Figure 7:
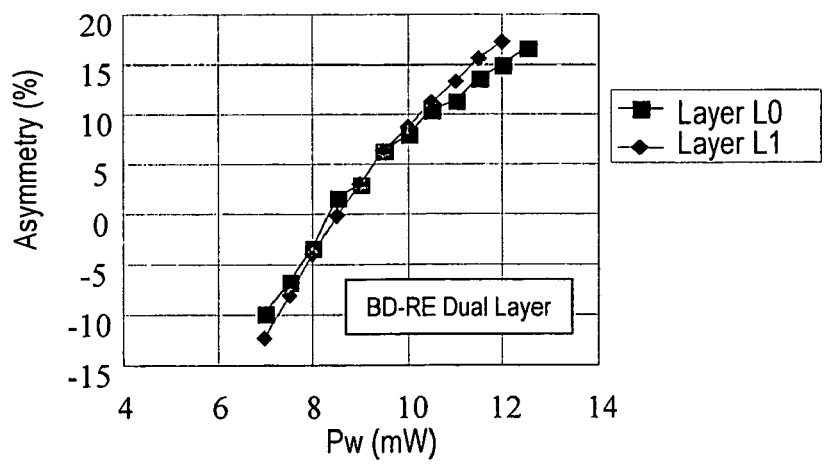
Figure 15:
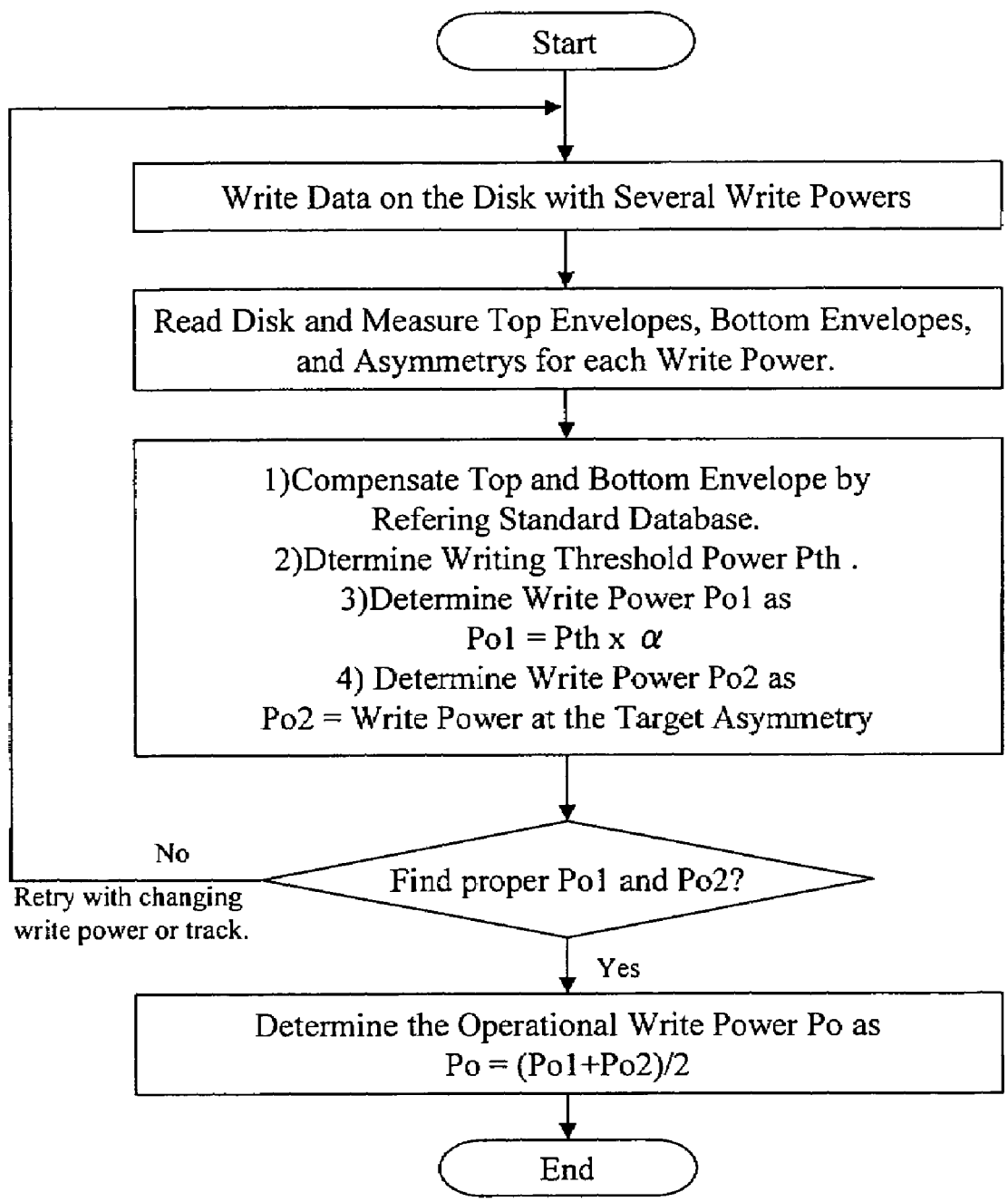
FIG. 15 is a flowchart showing a flow of processing according to another example of the present invention.

FIG. 15 is a flowchart showing a flow of processing according to another example of the present invention. When characteristics of the DVD-RW disk (FIG. 5) and the BD-RE dual-layer disk (FIG. 7) are compared, it is found out that the BD-RE dual-layer disk has a larger rate of change in the asymmetry relative to the write power. As described above, it is a fact that the rewritable optical disk generally has a smaller rate of change in the asymmetry relative to the write power than the write-once optical disk. However, according to a corresponding format or targeting performance, the characteristics described above differ for each recording material. Although not described in detail here, it is expected that a recording film of the DVD-RW disk shown in FIG. 5 is a eutectic or melt-erasing type recording film, and that a recording film of the BD-RE dual-layer disk shown in FIG. 7 is a compound or solid-phase erasing type recording film. For an optical disk using a recording material having the characteristics shown in FIG. 7, the asymmetry value can be used for determining the write power.

Since the sequence shown in FIG. 15 overlaps in large part with that shown in FIG. 12, differences therebetween will be briefly described. In this example, a write power Po1 figured out from a modulation depth in which inter-layer interference is compensated and a write power Po2 which makes an asymmetry value equal to a target value are figured out at the same time. Thereafter, as an average between the both powers, a write power Po is found by the following equation.

$$Po=(Po1+Po2)/2 \quad (11)$$

As described above, the asymmetry value is not influenced by the inter-layer interference. Thus, by use of such a method of determining a write power, a learning error may be reduced in some cases. This method is only effective for an optical disk having characteristics as shown in FIG. 7, and is not effective for an optical disk having characteristics as shown in FIG. 5.

In this example, the write powers, figured out respectively based on the modulation depth in which the inter-layer interference is compensated and based on the asymmetry, are averaged, and thereby, the figured out power is used for writing user data. However, as described above, the respective write powers have different measurement errors. Thus, generally, by using a coefficient u, the power Po for writing the user data is figured out by the following equation and condition.

$$Po=Po1 \times \mu + Po2 \times (1-\mu) \quad (12)$$

$$0 \leq \mu \leq 1 \quad (13)$$

Consequently, the errors can be minimized. The value of $\mu$ may be determined by taking into consideration the effect where the dispersion in the write power becomes $1\sqrt{2}$. The effect is found in the following manner. Specifically, OPC trials are performed, for example, about 100 times to find an average value of the Po1 value and the Po2 value for each trail and the dispersion of the average values. Thereafter, the two values, that is, each of the average values and the dispersion, are averaged to find the effect where the dispersion of the write power becomes $1\sqrt{2}$. Also in the following example, for simplicity, a description will be given of only the case of $\mu=0.5$ as expressed by the equation (11). However, the value of $\mu$ may be properly set within a range of 0 to 1. The intention of this example is to properly set a power for writing user data as a value between a write power Po1 found based on a modulation depth in which inter-layer interference is compensated and a write power Po2 found based on asymmetry.

Figure 16:
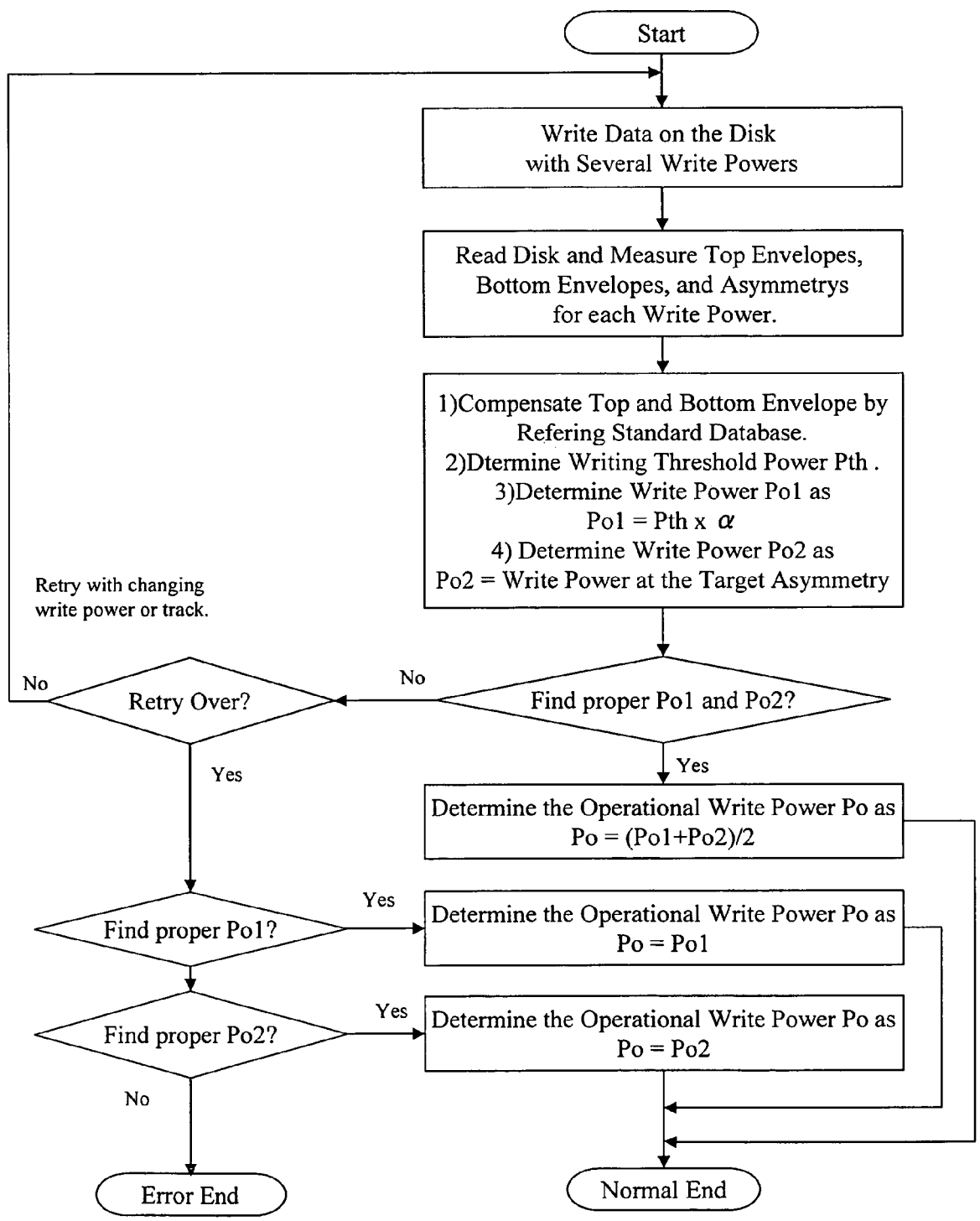
FIG. 16 is a flowchart showing a flow of processing according to another example of the present invention.

FIG. 16 is a flowchart showing a flow of processing according to another example of the present invention. A sequence in this example is basically the sequence shown in FIG. 15, but more specific retry determination is added thereto. In this example, when a write power is not found by performing a predetermined number of retries, any of Po1, Po2 and (Po1+Po2)/2 values is used as a highly reliable write power. By use of such a method, an OPC error frequency is lowered. Thus, except for a particular case, data specified by a user can be recorded.

Figure 17:
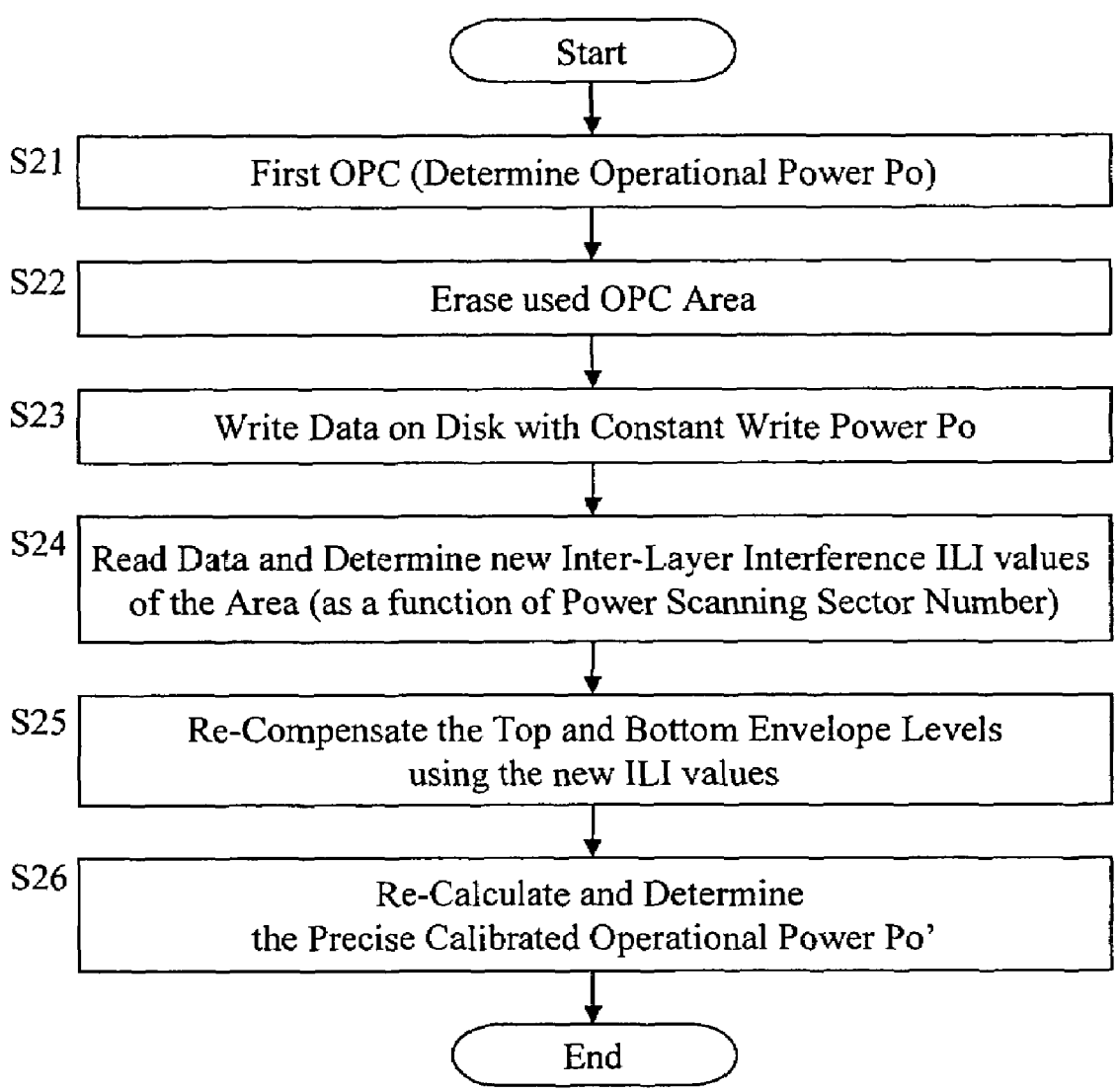
FIG. 17 is a flowchart showing a flow of processing according to another example of the present invention.

FIG. 17 is a flowchart showing a flow of processing according to another example of the present invention. In this example, based on the sequence shown in FIG. 12, more precise compensation of inter-layer interference is performed. This example has the following features.

First, based on the sequence shown in FIG. 12, a write power Po is figured out (S21). Subsequently, after a recorded data region is erased (S22), a data pattern is written with a write power set constantly at the write power Po (S23). Next, the data is read, and a compensation value of an offset by inter-layer interference for each sector is figured out based on a relationship between asymmetry and a modulation depth for each sector (for each write power) (S24). In this event, as described in FIG. 9, by having at least two pairs of data on the asymmetry and the modulation depth, a standard value of the modulation depth for each sector can be found by use of interpolation processing or the like. Next, a similar operation is performed by compensating data of an initial write-and-read sequence with the figured-out inter-layer interference amount for each of the sectors (each of the write powers) (S25). Thus, a write power Po' is determined (S26). By performing such a sequence, the inter-layer interference can be compensated based on the situations of the individual sectors depending on a value of an interval between layers and recorded states of another layer. Thus, a proper write power can be more accurately determined.

The above sequence will be described more in detail below.

(1) A write power calibration block is formed by writing a data pattern for power calibration in a first recording layer of an optical disk medium having at least two data recording layers, while a plurality of write powers are changed in a stepwise manner. For example, the write power calibration block can be formed by changing the write powers sector by sector. In addition, the write powers may be changed by a unit shorter than the sector or by a unit longer than the sector.

(2) A readout signal obtained by reading the write power calibration block is passed through a top envelope detector, a bottom envelope detector and a low-path filter to acquire a first top envelope value, a first bottom envelope value and a first low-path filter value, all of which correspond to the write powers changed in a stepwise manner.

(3) From the first top envelope value and the first bottom envelope value, a first signal modulation depth corresponding to the write power is calculated.

(4) From a difference between the first low-path filter value and an average value of the first top envelope value and the first bottom envelope value, a first asymmetry amount corresponding to the write power is calculated.

(5) From a relationship between the first signal modulation depth and the first asymmetry amount, a first signal offset amount due to inter-layer interference from the recording layer other than the first recording layer is estimated by referring to previously held standard data.

(6) A second top envelope value and a second bottom envelope value, in both of which the inter-layer interference is compensated, are calculated by subtracting the first signal offset amount due to the inter-layer interference respectively from the first top envelope value and the first bottom envelope value.

(7) From the second top envelope value and the second bottom envelope value, a second signal modulation depth, which depends on the write power, and in which the inter-layer interference is compensated, is calculated.

(8) A first threshold power for writing is determined based on the second signal modulation depth.

(9) A first write power is determined by multiplying the first threshold power by a predetermined coefficient.

(10) The data pattern for power calibration is written in the write power calibration block with the write power set constantly at the first write power. Thus, an inter-layer interference calibration block is formed.

(11) The inter-layer interference calibration block is read, and a third top envelope value, a third bottom envelope value and a third low-path filter value are acquired, respectively, from output of the top envelope detector, output of the bottom envelope detector and output of the low-path filter at a spot corresponding to each of the write powers in the write power calibration block.

(12) From the third top envelope value and the third bottom envelope value, a third signal modulation depth at the spot corresponding to each of the write powers in the write power calibration block is calculated.

(13) From a difference between the third low-path filter value and an average value of the third top envelope value and the third bottom envelope value, a third asymmetry amount corresponding to the write power is calculated.

(14) Based on a relationship between the third signal modulation depth and the third asymmetry amount, a second signal offset amount, which is caused by the inter-layer interference from the recording layer other than the first recording layer, at the spot corresponding to each of the write powers in the write power calibration block is estimated by referring to the standard data.

(15) A fourth top envelope value and a fourth bottom envelope value, in both of which the inter-layer interference is compensated, are calculated by subtracting the second signal offset amount corresponding to each of the write powers respectively from the third top envelope value and the third bottom envelope value.

(16) From the fourth top envelope value and the fourth bottom envelope value, a fourth signal modulation depth corresponding to the write power is calculated

(17) A second threshold power for writing is determined based on the fourth signal modulation depth.

(18) A second write power is determined by multiplying the second threshold power by a predetermined coefficient.

(19) A third write power is determined so as to make the second asymmetry amount equal to a predetermined value.

(20) A fourth write power for writing user data is determined to be a value between the second write power and the third write-power.

(21) The user data is written by use of the fourth write power.

What is claimed is:

1. A writing method of writing information in an optical disk medium having not less than two data recording layers, comprising the steps of:

writing a data pattern for power calibration in a first recording layer of the optical disk medium while a write power is changed in a stepwise manner;

calculating a signal modulation depth and an asymmetry amount, which correspond to the write power, from a readout signal obtained by reading the data pattern;

estimating a signal offset amount due to inter-layer interference from the recording layer other than the first recording layer by referring to previously stored standard data based on a relationship between the signal modulation depth and the asymmetry amount;

calculating a signal modulation depth, in which the inter-layer interference is compensated, depending on the write power in consideration of the signal offset amount; and determining a write power for writing user data, based on the signal modulation depth, in which the inter-layer interference is compensated, depending on the write power.

2. The writing method according to claim 1, wherein:

a top envelope value and a bottom envelope value, in which the inter-layer interference is compensated, are figured out by subtracting the signal offset amount due to the inter-layer interference from a top envelope value and a bottom envelope value of the readout signal; and a signal modulation depth, in which the inter-layer interference is compensated, is calculated by use of the top envelope value and the bottom envelope value, in which the inter-layer interference is compensated.

3. The writing method according to claim 1, wherein the step of determining the write power for writing the user data includes the steps of:

determining a threshold power for writing based on the signal modulation depth, which depends on the write power, and in which the inter-layer interference is compensated;

determining a first write power by multiplying the threshold power by a predetermined coefficient; and determining a second write power which makes the asymmetry amount equal to a predetermined value, and the writing method wherein the calibrated write power is determined to be a value between the first write power and the second write power.

4. The writing method according to claim 1, wherein the data pattern for power calibration is a data pattern including repetition of a shortest mark of a modulation code to be used and a space, and repetition of a longest mark thereof and a space.

5. A writing method of writing information in an optical disk medium having not less than two data recording layers, comprising the steps of:

forming a write power calibration block by writing a data pattern for power calibration in a first recording layer of the optical disk medium while a plurality of write powers are changed in a stepwise manner;

calculating a first signal modulation depth and a first asymmetry amount, which depend on the write power, from a readout signal obtained by reading the write power calibration block;

estimating a first signal offset amount due to inter-layer interference from the recording layer other than the first recording layer by referring to previously stored standard data based on a relationship between the first signal modulation depth and the first asymmetry amount;

calculating a second signal modulation depth, which depends on the write power, and in which the inter-layer interference is compensated, in consideration of the first signal offset amount;

determining a first write power based on the second signal modulation depth;

after erasing the write power calibration block, forming an inter-layer interference calibration block by writing the data pattern for power calibration with the write power set constantly at the first write power in a way that the write power calibration block is written over the erased write power calibration block;

reading the inter-layer interference calibration block and calculating a third signal modulation depth and a third asymmetry amount at a spot corresponding to each of the write powers in the write power calibration block;

estimating a second signal offset amount at the spot corresponding to each of the write powers in the write power calibration block due to the inter-layer interference from the recording layer other than the first recording layer, by referring to the standard data, based on a relationship between the third signal modulation depth and the third asymmetry amount;

calculating a fourth signal modulation depth, which depends on the write power, and in which the inter-layer interference is compensated, in consideration of the second signal offset amount; and determining a write power for writing user data, based on the fourth signal modulation depth.

6. The writing method according to claim 5, wherein the determining step of the write power for writing the user data includes the steps of:

determining a second threshold power for writing based on the fourth signal modulation depth;

determining a second write power by multiplying the second threshold power by a predetermined coefficient;

determining a third write power which makes the second asymmetry amount equal to a predetermined value; and determining the write power for writing the user data to be a value between the second write power and the third write power.

7. The writing method according to claim 5, wherein the data pattern for power calibration is a data pattern including repetition of a shortest mark of a modulation code to be used and a space, and repetition of a longest mark thereof and a space.

8. An optical disk device which writes information in an optical disk medium having not less than two data recording layers, comprising:

means which holds a standard relationship between a signal modulation depth and an asymmetry amount as standard data;

means which writes a data pattern for power calibration in a first recording layer of the optical disk medium while a write power is changed in a stepwise manner;

means which calculates a signal modulation depth and an asymmetry amount from a readout signal of the data pattern recorded in the optical disk medium;

means which estimates a signal offset amount due to inter-layer interference from the recording layer other than the first recording layer, by referring to the standard data, based on the calculated signal modulation depth and asymmetry amount, and which calculates a signal modulation depth in which the inter-layer interference is compensated in consideration of the signal offset amount; and means which determines a write power for writing user data based on the signal modulation depth, which depends on the write power, and in which the inter-layer interference is compensated.

9. The optical disk device according to claim 8, further comprising:

a top envelope detector which acquires a top envelope value of a readout signal;

a bottom envelope detector which acquires a bottom envelope value of the readout signal; and a low-path filter which acquires a low-path filter value, the optical disk device, wherein a signal modulation depth is calculated from the top and bottom envelope values of the readout signal, and an asymmetry amount is calculated from a difference between an average value of the top and bottom envelope values and a low-path filter value.

10. The optical disk device according to claim 9, wherein a top envelope value and a bottom envelope value, in which the inter-layer interference is compensated, are calculated by subtracting the signal offset amount due to the inter-layer interference from the top envelope value and the bottom envelope value of the readout signal, and a signal modulation depth, which depends on the write power, and in which the inter-layer interference is compensated, is calculated from the top and bottom envelope values in which the inter-layer interference is compensated.

11. The optical disk device according to claim 8, wherein a threshold power for writing is determined based on the signal modulation depth, which depends on the write power, and in which the inter-layer interference is compensated, and a write power for writing user data is determined by multiplying the threshold power for writing by a predetermined coefficient.

12. The optical disk device according to claim 8, wherein the data pattern for power calibration is a data pattern including repetition of a shortest mark of a modulation code to be used and a space, and repetition of a longest mark thereof and a space.

* * * * *